April 13, 1926.

C. SCHLÜNS 1,580,858

CALCULATING MACHINE

Filed April 5, 1924    12 Sheets-Sheet 1

April 13, 1926.

C. SCHLÜNS 1,580,858

CALCULATING MACHINE

Filed April 5, 1924      12 Sheets-Sheet 4

Inventor
Carl Schlüns
By Knight Bros.
Attys

April 13, 1926.

C. SCHLÜNS

CALCULATING MACHINE

Filed April 5, 1924    12 Sheets-Sheet 5

1,580,858

Inventor
Carl Schlüns
By Knight Bros
Attys

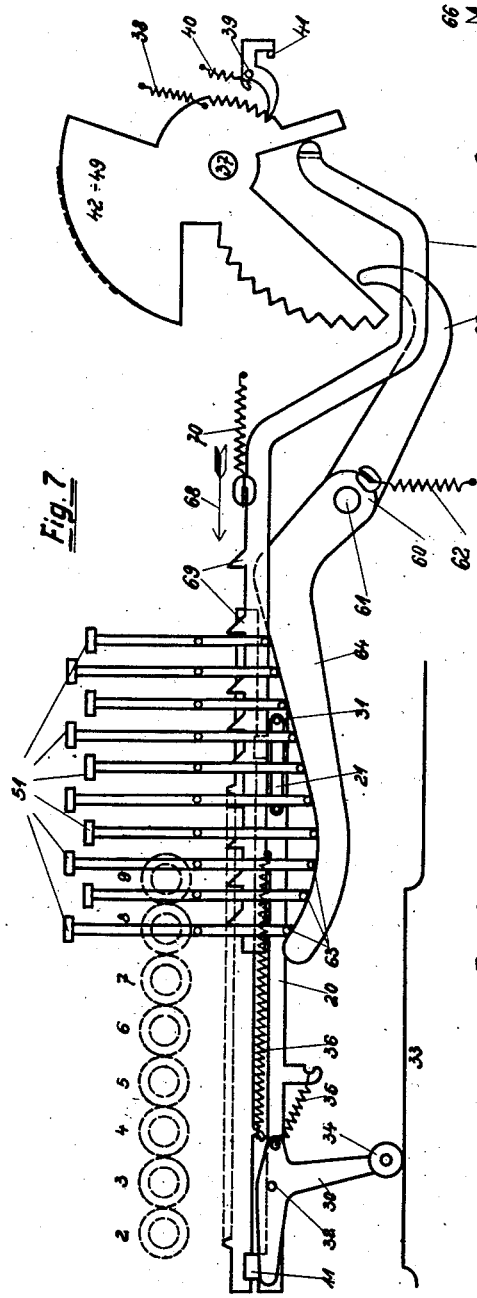

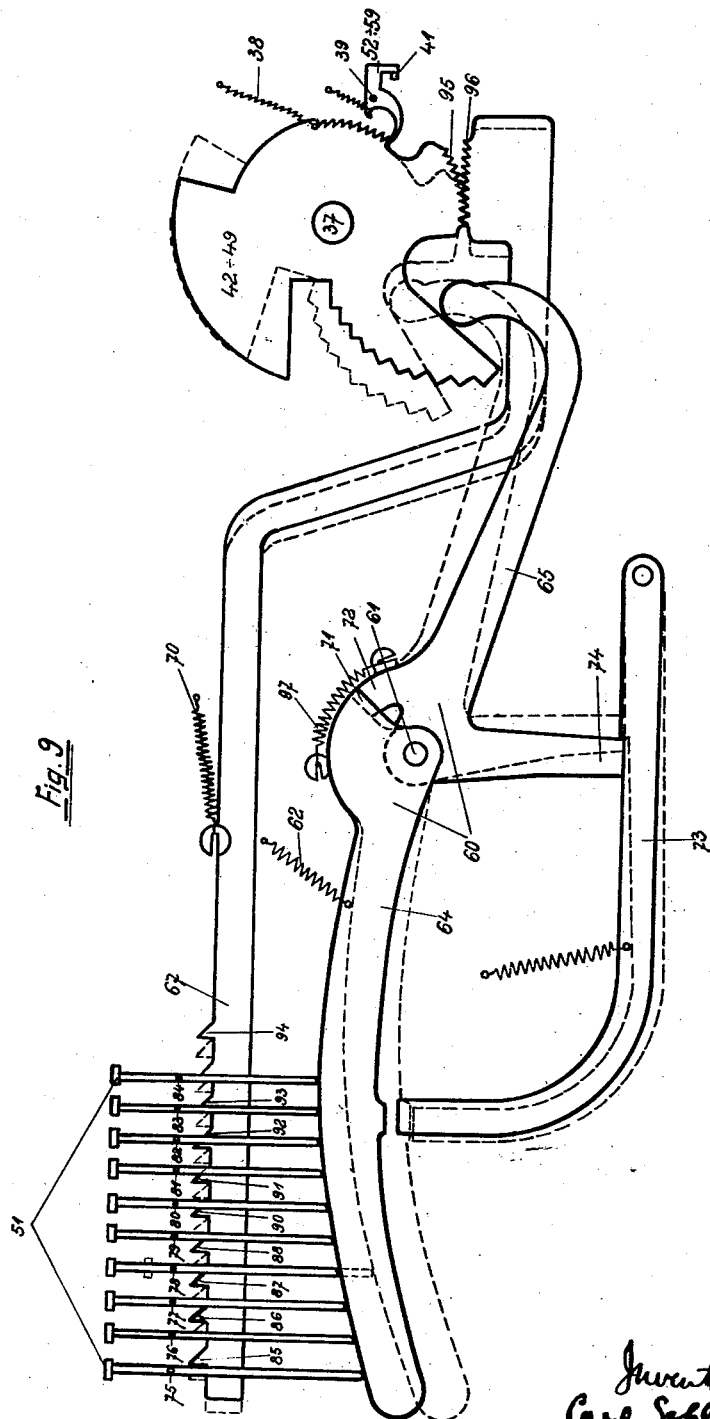

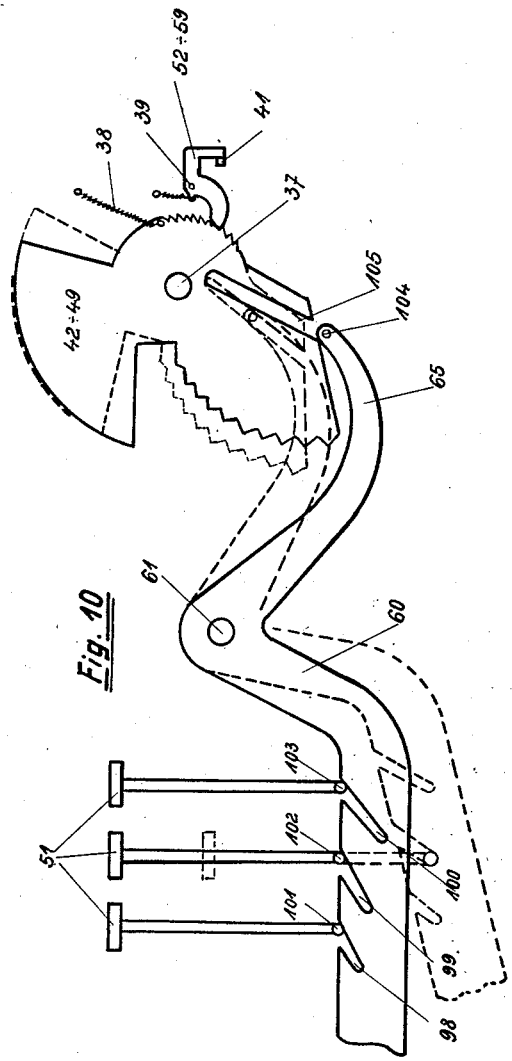
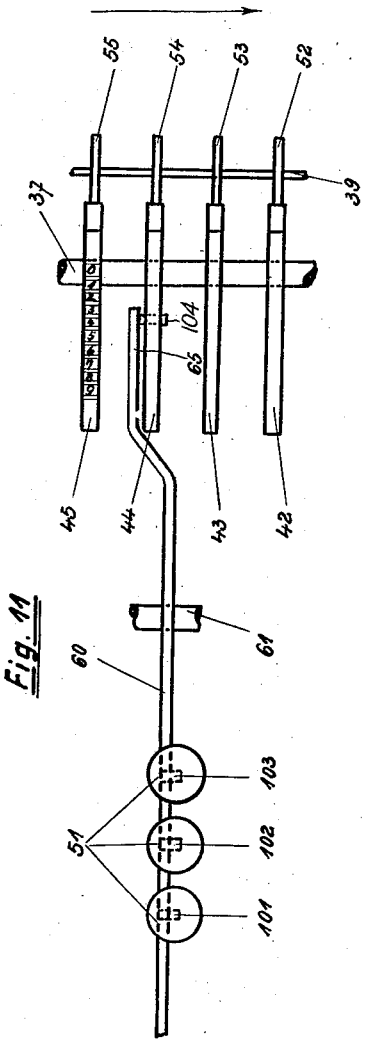

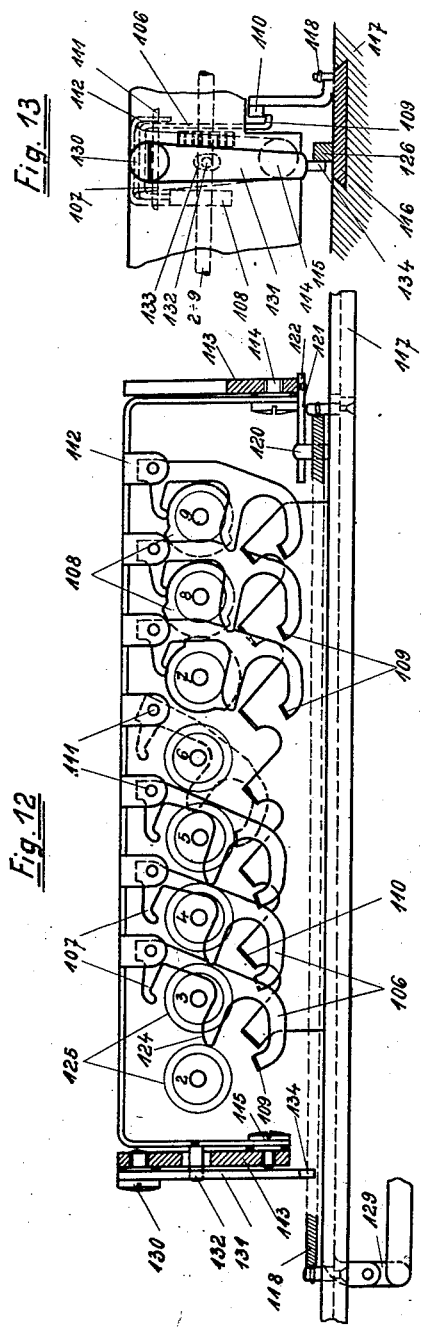

April 13, 1926.  
C. SCHLÜNS  
CALCULATING MACHINE  
Filed April 5, 1924  
1,580,858  
12 Sheets-Sheet 10

Inventor
Carl Schlüns
By Kingdom
Attys

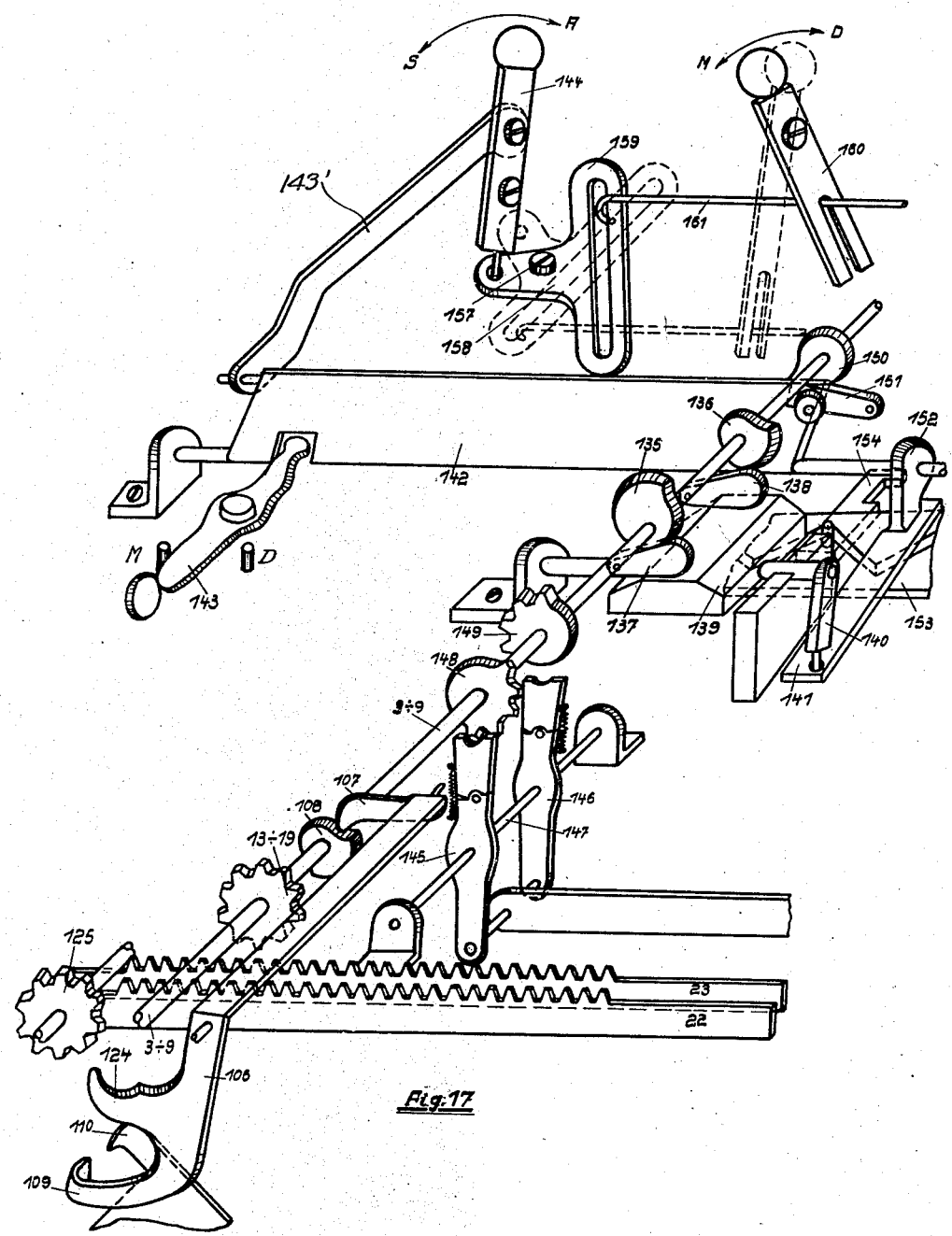

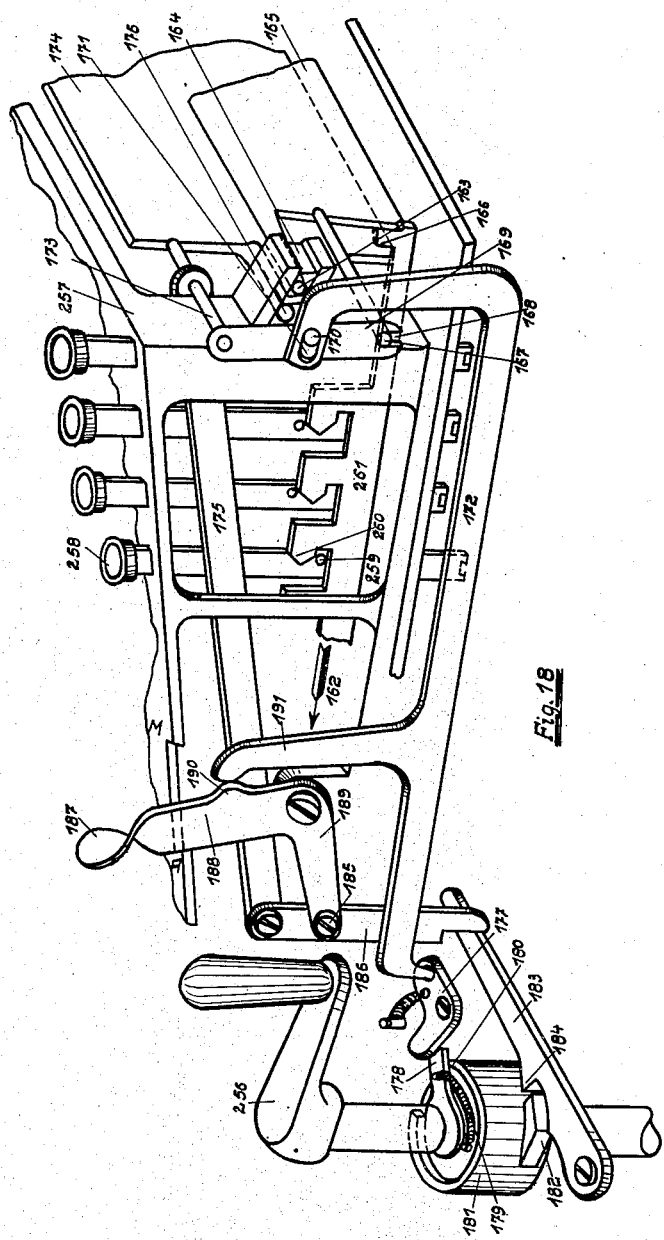

Patented Apr. 13, 1926.

1,580,858

UNITED STATES PATENT OFFICE.

CARL SCHLÜNS, OF STEGLITZ, NEAR BERLIN, GERMANY, ASSIGNOR, BY MESNE ASSIGNMENTS, TO GUSTAV MEZ, DOING BUSINESS AS MERCEDES BÜROMASCHINEN UND WAFFENWERKE.

CALCULATING MACHINE.

Application filed April 5, 1924. Serial No. 704,397.

*To all whom it may concern:*

Be it known that I, CARL SCHLÜNS, a citizen of Germany, residing at Bruckenstrasse 3, Steglitz, near Berlin, Germany, have invented certain new and useful Improvements in Calculating Machines (for which I have filed applications in Germany on February 11, 1922; March 21, 1922; October 26, 1922; July 14, 1923; October 23, 1923), of which the following is a specification.

This invention relates to a calculating machine for any kind of calculations with automatic multiplication process controlled from the multiplicator mechanism adjusted prior to the calculation.

According to the invention a separate adjusting block composed of several adjusting elements is provided for adjusting the multiplicator. A set of keys permits of controlling, by means of convenient intermediate elements, one of the adjusting elements according to one figure of the multiplicator. After this has been done the adjusting block moves for one step transversely to the set of keys so that its next adjusting element gets into the position in which it is acted upon. In this manner a number of adjusting elements corresponding with the number of figures of the multiplicator mechanism are adjusted to the values corresponding with the several figures of the multiplicator. The connection of the set of keys, intermediate elements and adjusting elements is either positively closing, any excessive movement being prevented by a separate locking element, or it is positively guided so that the locking element is not required. After this preliminary adjusting has been effected the total value of the adjusting blocks is transferred to the multiplicator mechanism by a movement of the latter relative to the adjusting block. For this movement the pulling out movement of the carriage of the counting mechanism may be used which movement is necessary per se. A new adjusting of a new multiplicator into the adjusting block is possible already while the machine is still working on the first problem.

The multiplication process is carried out in a novel abbreviated manner. Every multiplicator axle which has been adjusted to the figures "6", "7", "8" or "9" produces, prior to the calculation, a feeding of the next higher place for one unit, without however altering its own adjustment. This is attained by means of transmission elements provided for each place which ascertain by feeling the adjusting of the places and effect the feeding of the neighbouring axles as they are operated by driving means adapted to execute a movement relatively to them. By the provision of a corresponding number of driving means the feeding is ensured even when the axle which produces the same is brought, by being fed itself, into an inoperative position, and even when it is brought into the operative position only by the feeding. An automatic reversing mechanism controls the calculating machine in such a manner that all places with the figure "0" are jumped in the well known manner, all places with the figures "1", "2", "3", "4" or "5" are counted in the positive sense, viz., adding, all places with the figures "6", "7", "8" or "9" being however counted negatively, viz, subtracted. At the multiplication by the figure "8" for instance the factor in the adjusting mechanism of the machine, instead of being added eight times, will be at first multiplied by "10" owing to the feeding of the next higher place, whereupon it is twice subtracted by the negative working off of the "8" across "9" to "0", wherefrom results a considerable saving of time. The machine comprises a reversing mechanism from multiplication to addition, which puts in gear a mechanism of known type, which clears the adjusting mechanism after each complete calculation process. The basic machine to which the present invention is to be particularly applied is known as the Mercedes-Euklid and is described in Patent 1,011,617 or as an entirely automatic power driven machine in the patent to Christel Hamann, Patent No. 1,566,961 of December 22, 1925. According to this patent a setting device is provided for the multiplier and means are provided for zeroizing the digits of the multiplier successively by unit steps. That is to say, each number wheel of the setting device is uniformly returned to zero in a negative direction and as soon as a number wheel has been returned to zero the carriage is released and returns one step to the left whereupon the next number wheel is brought into operative position. It will be understood that the mechanism for accomplishing shortened multiplication is intended to replace the setting device as described in the above application. With the aid of a locking mechanism of new type the crank handle is locked in this machine in the zero position until a new key is depressed in the adjusting mechanism. This locking is effected by a locking bolt known per se, which is released through the intermediary of a rod system by the movement of the key, while its renewed releasing during the clearing operation is prevented by the utilization of an existing counter movement. The decimal and other subdividing signs are thus brought in a positive dependency from one another in such a manner, that the adjusting of the signs in two counting mechanisms, which are independent the one of the other, produces automatically the mathematically correct adjusting of other signs in dependent counting mechanisms. By means of a shaft grooved in spiral shape the displacement, for instance of the comma sign in the adjusting mechanism is transformed into a rotating movement which is transmitted to a movable frame, carrying for instance the comma of the mechanism which counts the rotations, where it is retransformed on the frame itself also by a spiral groove into a displacement of the comma in the result. In this manner both displacements, that of the sign in the adjusting mechanism, and that of the frame are combined to effect the displacement of the third sign.

An embodiment of the invention is shown by way of example on the accompanying drawings, in which:

Fig. 7 shows the same arrangement at the return travel of the carriage.

Fig. 8 is a plan view of this arrangement.

Fig. 9 shows in front elevation a special form of construction of this arrangement.

Fig. 10 shows separately the construction of the right hand part of this mechanism.

Fig. 11 is a plan view of Fig. 10.

Fig. 12 shows the transferring mechanism of the axles of the multiplicator mechanism in elevation.

Fig. 13 is a side elevation of Fig. 12.

Fig. 14 shows in plan view the control bars of this transferring mechanism.

Fig. 17 shows in perspective view one place of the multiplicator mechanism with the adjusting- transferring- working off- and control mechanism.

Fig. 18 shows in a perspective rear view the automatical locking device for the crank and the annulling mechanism for the keys.

Figure 1:
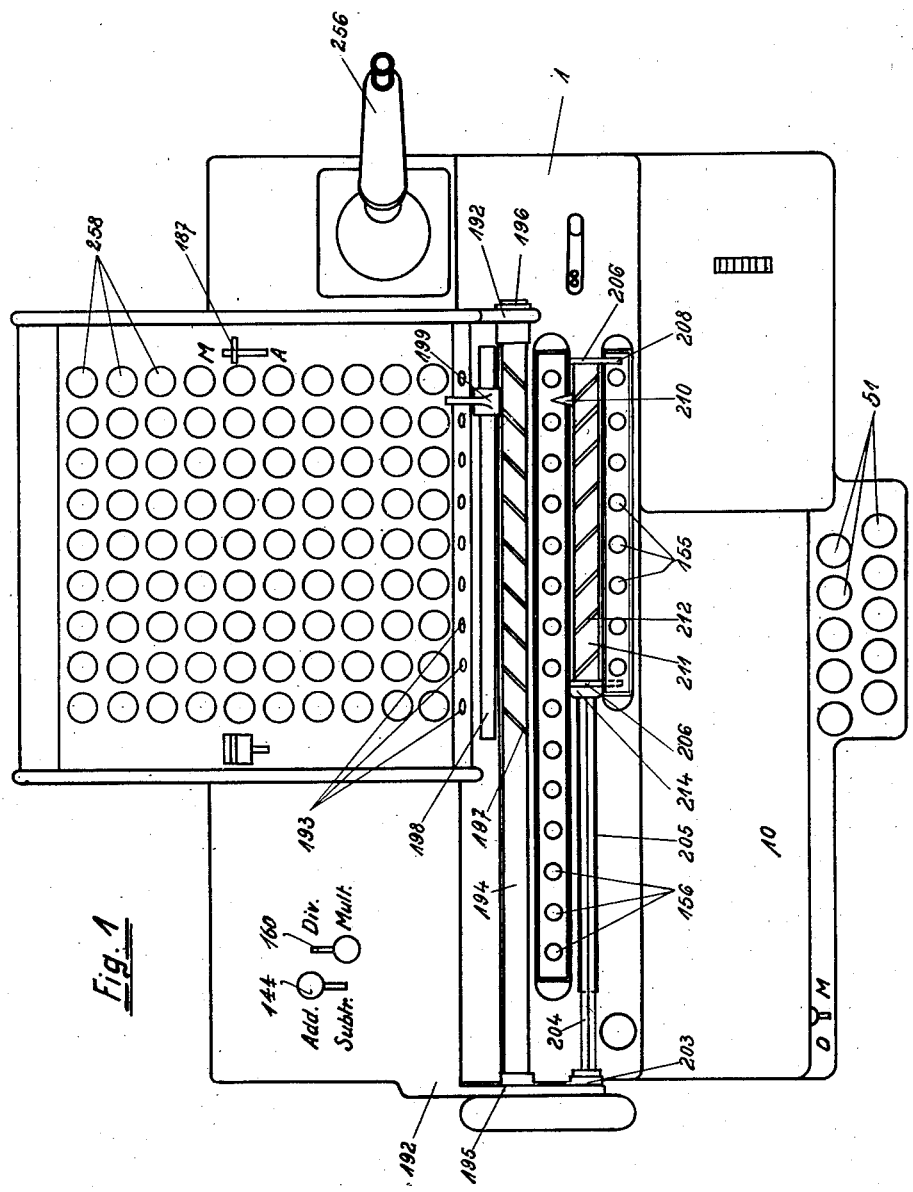
Fig. 1 shows in plan view the improved mechanisms connected with a Mercedes-Euklid calculating machine.
Figure 2:
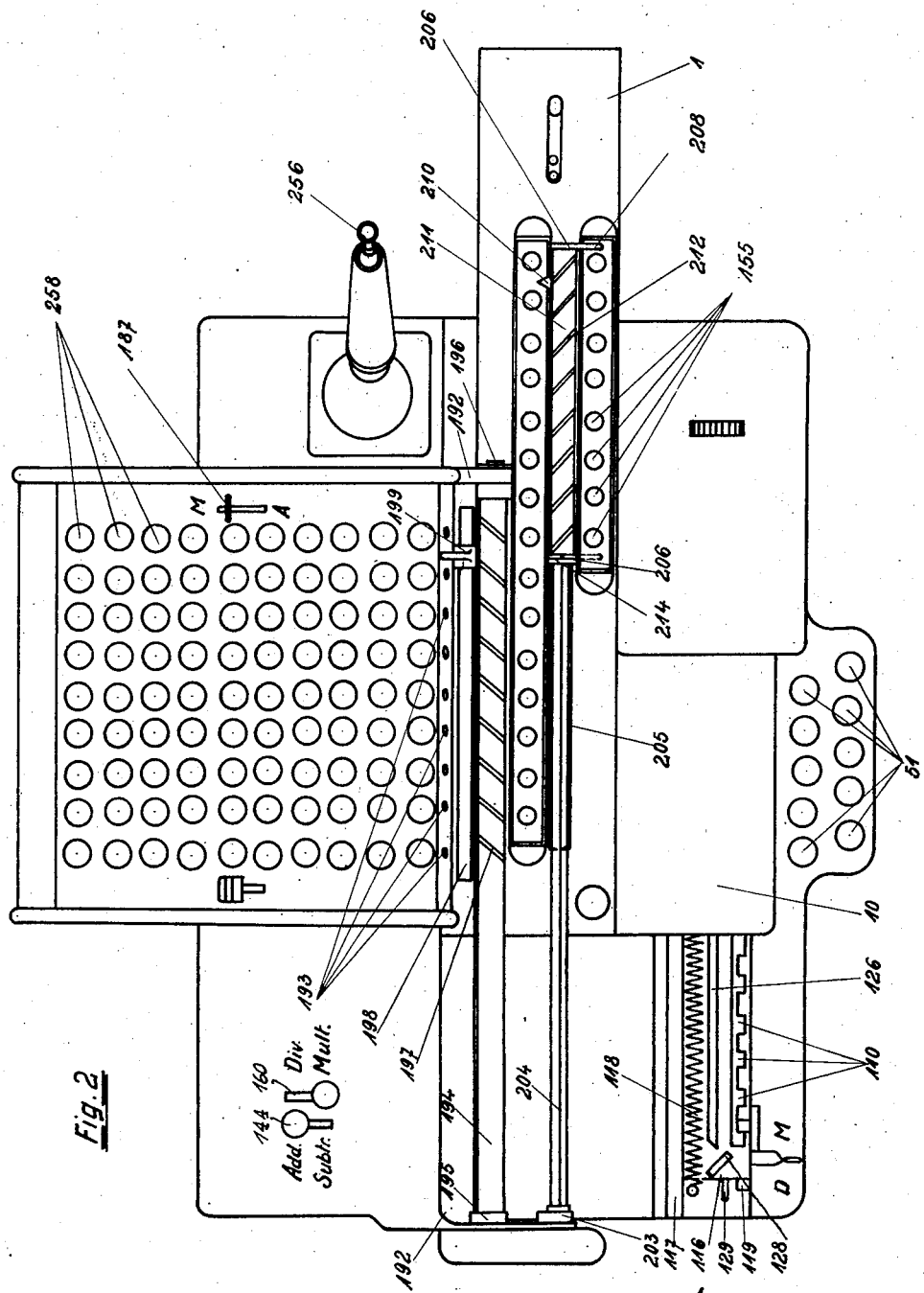
Fig. 2 is a similar view as Fig. 1 the carriage being pulled out.
Figure 3:
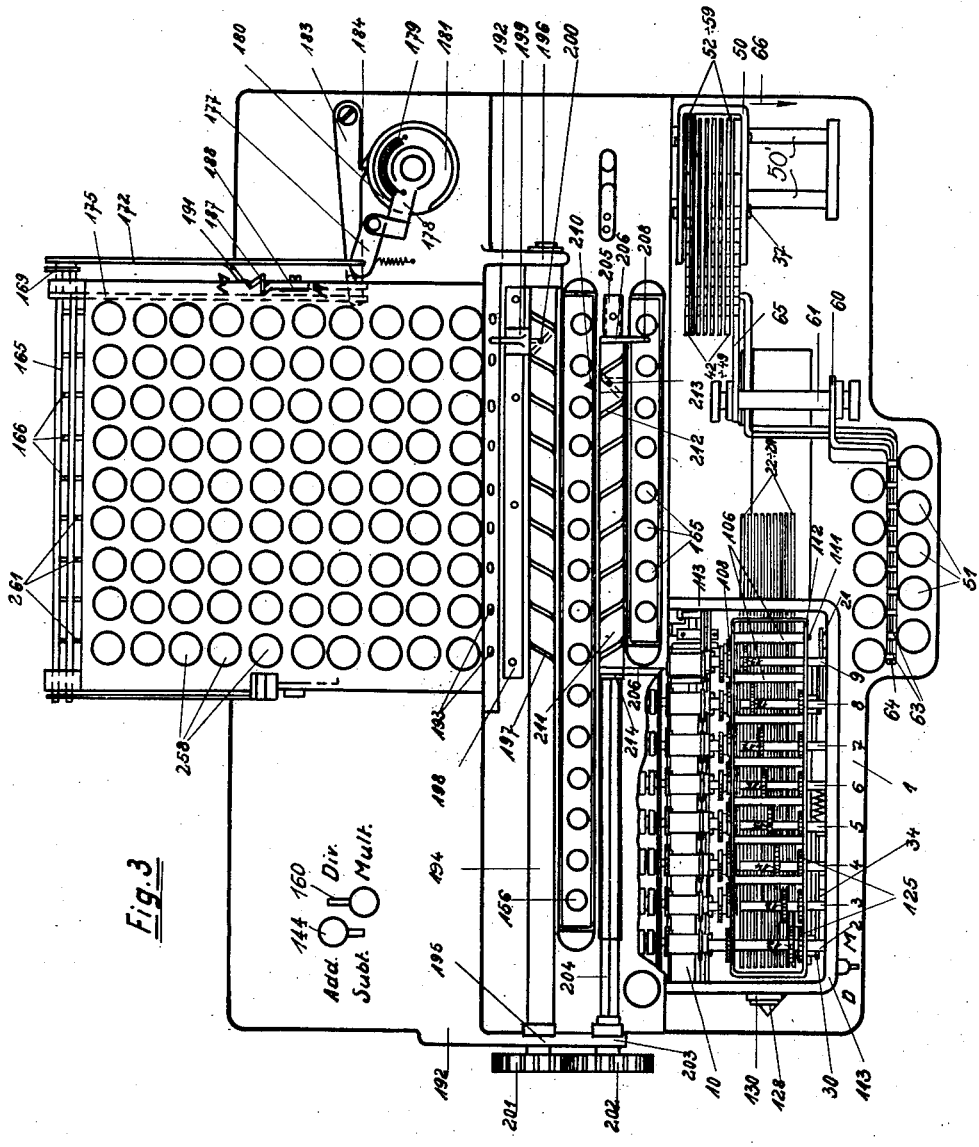
Fig. 3 is a similar view as Fig. 1, the cover plates being removed.
Figure 4:
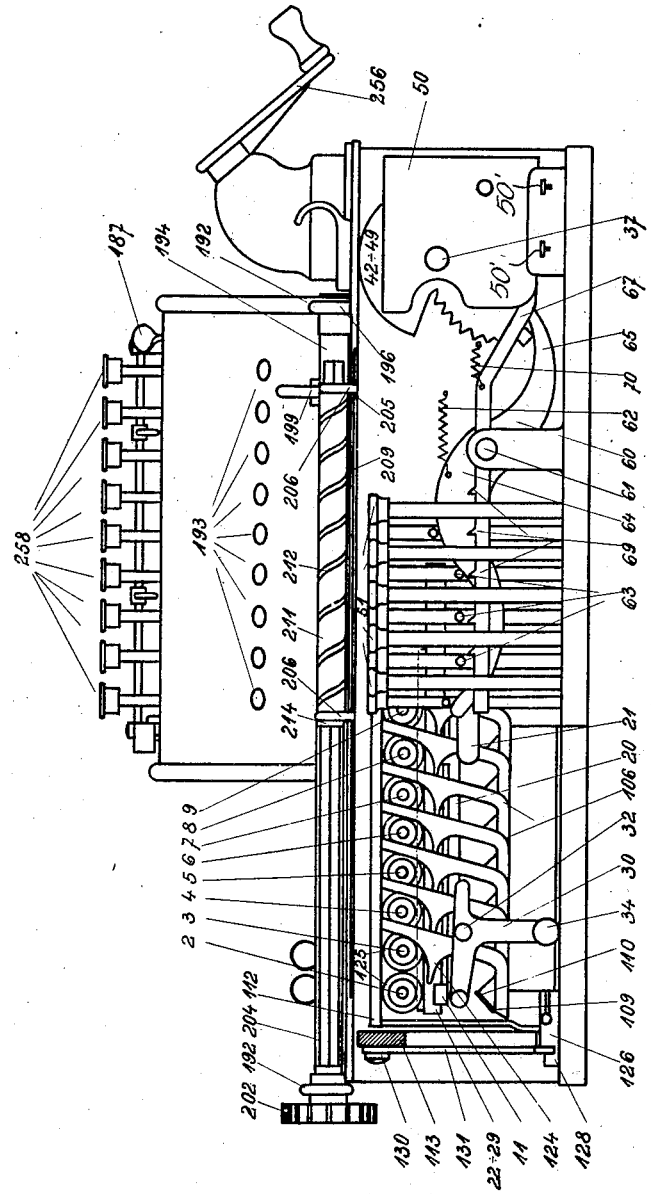
Fig. 4 is a front elevation, the front plates being removed.
Figure 5:
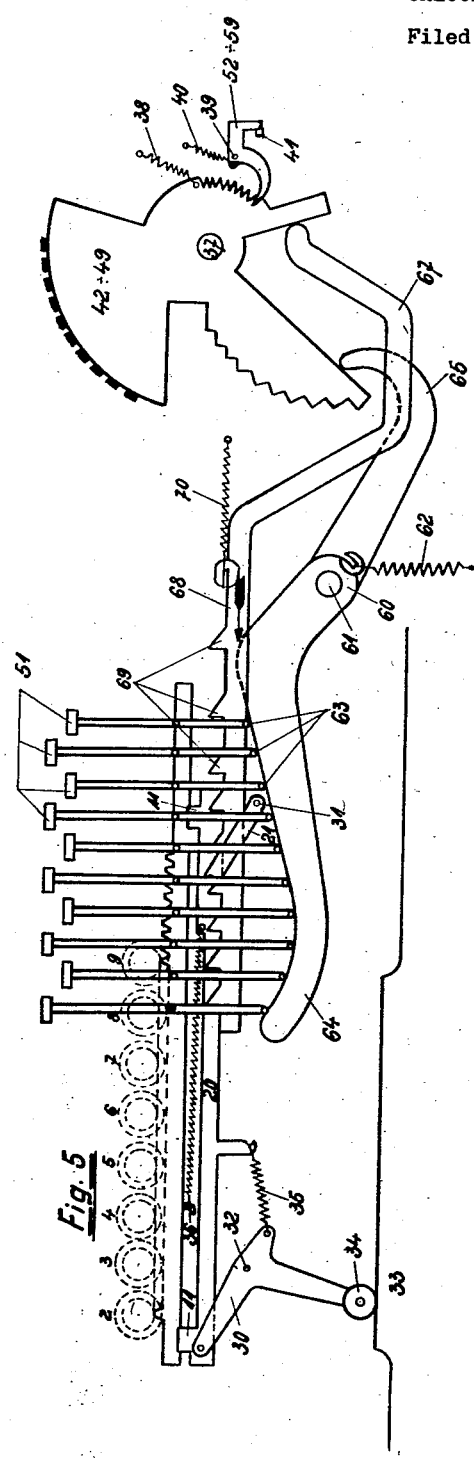
Fig. 5 shows the adjusting mechanism for the multiplicator mechanism in elevation in the position which it assumes at the pulling out of the carriage.
Figure 6:
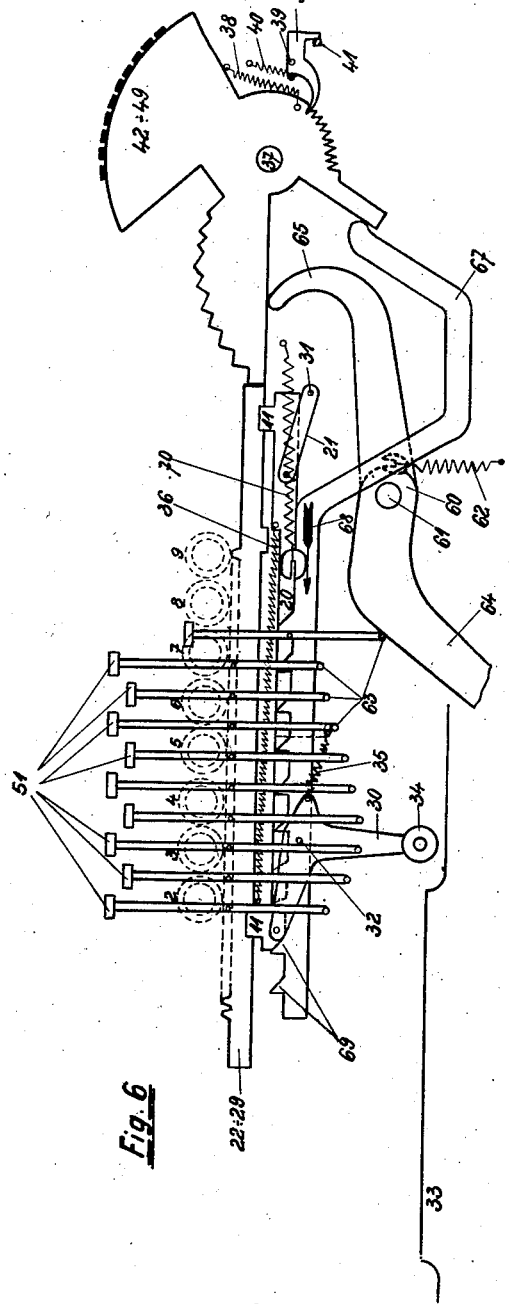
Fig. 6 shows the same arrangement at renewed right hand adjusting of the carriage.
Figure 15:
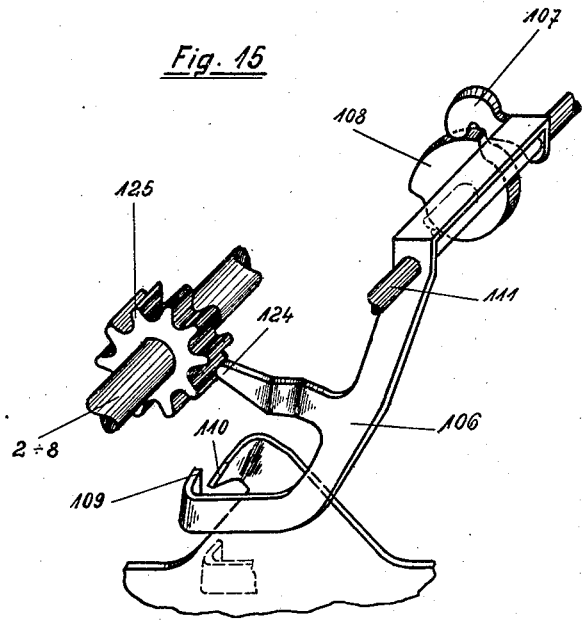
Fig. 15 is a perspective view of the transferring lever.

From the counter-carriage 1 (Fig. 1), which at the beginning of the calculating operation has to be pulled out into the right hand position shown in Fig. 2, project eight multiplicator axles 2 to 9 of the multiplicator mechanism 10 to be adjusted. These axles carry adjusting wheels 12 to 19 stepped in the manner shown in Figs. 3 and 8, and gearing temporarily with the racks 22 to 29 arranged below them. The guide bars 11 (Figs. 4, 5, 6, 7 and 8) in which the racks 22 to 29 slide are connected with one another by means of longitudinal members 20 to form a frame which is suspended on levers 21 and 30 so that it can oscillate around the pivots 31 and 32 to be raised, as shown in Figs. 5, 6 and 7 up the height of the wheels. The raising is effected by means of a guide 33 for the roller 34 of lever 30, said guide being fixed on the base plate of the machine.

When the carriage 1 is pulled to the right as shown in Fig. 2 the roller 34 is pushed to the left by the surfaces 33 and maintained in this position. The racks 22 to 29 are in engagement (Fig. 5). At the reversing a spring 35 pulls the system into the position shown in Fig. 6 and springs 36 bring the racks 22 to 29 back to the zero position. At the backward travel of the carriage the roller 34 gets into the position shown in Fig. 7 (turned toward the right) and the racks 22 to 29 are depressed still farther. The carriage 1 being in the position of rest all axles 2 to 9 of the counter mechanism are in the zero position as they have completed their work and all the racks 22 to 29 have been brought to the zero position by the action of their springs 36. If these ends are made to strike, at the pulling of the carriage 1 into the position indicated in Fig. 6, against abutments 42 to 49 adapted to be adjusted at will, the racks 22 to 29 will be stopped sooner or later in accordance with the position of the abutments 42 to 49 and the adjusting wheels 12 to 19 coupled with said racks 22 to 29 are rotated until the carriage 1 reaches the extreme right hand position.

The racks 22 to 29 which up to this moment have not encountered any abutment cause evidently no rotation of the coresponding adjusting wheels 12 to 19. The abutments consist of several adjusting elements 42 to 49 rotatably mounted the one at the side of the others upon a common shaft 37 and usually held by springs 38 in the lowest position indicated in Figs. 4, 5 and 7. The adjusting elements 42 to 49 have pawls 52 to 59 which are pivotally mounted on a common axle 39. These pawls 52 to 59 which, through the action of springs 40, are pressed against a bar 41, securely held the adjusting elements 42 to 49 in their actuated position, these adjusting elements being turned in clockwise direction by means of a device which will be hereinafter described. The adjusting elements 42 to 49, their springs 38 and pawls 52 to 59 are united in a block 50 (Figs. 3 and 4 which, after the adjusting of each element has been completed, moves stepwise on rails 50', similar to the movement of the carriage of a typewriting machine after the depression of a key. The adjusting elements consist of stepped sectors, the steps of which correspond each to the adjusting of a digit from "0" to "9".

A two-armed lever 60 pivotally mounted on an axle 61, adapted to be operated by a system of ten keys 51 and maintained by the action of a spring 62 in such a position that at the position of rest it is in contact with all the key rods 63, serves for the adjusting of the adjusting elements. The position of the key rods 63 and the shape of the arm 64 of the lever facing said key rods are selected so that by a downward stroke of the several key rods 63 for the same length oscillations of different amplitudes are executed by the arm 65 of the lever which is turned towards the adjusting elements 42 to 49, in accordance with the figures marked on the keys 51. One unit corresponds to one shaft of the adjusting elements. On the last part of their travel the keys 51 act upon a feeding element which makes the block 50 advance stepwise in the direction of the arrow 66, so that at the depression of the next key 51 the following adjusting element is acted upon.

The operation of this arrangement is as follows:

In the initial position the first element 42 is in the range of the lever 65. When a key 51 is being depressed this element 42 is rotated so that the step corresponding with the figure marked on the key is brought to the level of the rack 29. The adjusting element 42 is maintained in this position by the pawl 52. The block 50 moves back from the machine for one step in the direction of the arrow 66 so that the adjusting elements stand opposite the rack 28, the second element 43 being situated over the lever 65, whereupon this element 43 is raised by the depression of any of the keys 51, held by the pawl 53, and the block 50 moves again away from the machine for one step. When the zero key is depressed only the block 50 is operated but no adjusting element. The adjusting is effected in the succession in which the number is written. In order to prevent excessive rotation of the adjusting elements 42 to 49 these elements when moving in upward direction must displace by their abutments a bar 67 in the direction of arrow 68. This bar 67 has abutments 69 one for each key 51. When all the keys 51 are in the position of rest the bar 67 may freely slide, but if one of the keys 51 is depressed an abutment 69 of bar 67 will strike against the rod of the depressed key so that the bar 67 is stopped. The corresponding adjusting element 42 to 49 is thus stopped also and prevented to oscillate excessively. The stops 69 of bar 67 are arranged in such a manner that the adjusting element (42 to 49) is free to oscillate in upward direction only when the key is being depressed. A spring 70 pulls the abutment bar 57 against the sector to be adjusted as soon as the block 50 has advanced for one step.

If after the adjusting of the elements the carriage is pulled to the right the racks 22 to 29 strike against the elements 42 to 49 which have been adjusted. Owing to the stepwise arrangement of the adjusting wheels 12 to 19 the element 42 which has been adjusted by the depression of the first key acts upon the axle of the multiplicator mechanism 10 which corresponds with the highest place of the number which has been keyed. When the adjusting has been completed the bar 41 is moved to the right so that all adjusting elements 42 to 49 are returned to their initial position.

The number which has been set by the multiplicator keys is now transferred to the axles 2 to 9 of the multiplicator mechanism. As soon as the carriage 1 with the racks 22 to 29 has moved in the course of the calculating process so far to the left that the raising of the adjusting elements 42 to 49 is not impeded by the racks 22 to 29 the block 50 is pulled back by hand, so that it is ready for new adjustment. This is effected before the calculation is completed, for instance after the third place has been worked.

The adjusting of the number "325" would be as follows:—

Depression of the keys 51 marked with the figures "3", "2", "5", whereby the adjusting elements 42, 43, 44 are raised by the two armed lever 60, make the abutment bar 67 advance up to the abutment 69 against the depressed key 51, and are held by the locking pawl 52, 53, 54: The element 42 stands opposite 27, the element 43 opposite 28 and the element 44 opposite 29.

The carriage 1 is now pulled into the right hand end position whereby the racks 22 to 29 are raised and brought into engagement with their corresponding wheels 12 to 19. The rack 29 strikes against the adjusting element 44 so that the adjusting wheel 19 gearing with the rack 29 is rotated so that to the corresponding multiplicator axle 9 the value "5" is communicated. The values "3" and "2" are adjusted in the same manner, so that the number "325" is registered in the multiplicator mechanism. The carriage 1 arriving at the extreme right hand position the racks 22 to 29 descend, disengage from the wheels 12 to 19 and are brought into the zero position by the action of the springs 36. During this last short travel the pawls 52 to 59 are released whereupon the adjusting elements 42 to 49 and also the block 50 return to the position of rest.

Fig. 9 shows a slightly modified construction of the feeling mechanism. The lever 60 is composed of two levers 64 and 65 pivotally mounted on the pivot pin 61 and which are pulled the one towards the other so that the abutment 71 is in contact with the abutment 72. By a locking bolt 73 which bears against a downwardly projecting arm 74 of lever 65 this lever 65 is locked until the locking bolt 73 coming in contact with the left hand end of lever 64 descends and releases the lever 65. The keys 51 have each a laterally projecting pin 75 to 84 which are all situated at the same height and adapted to get in the path of one of the teeth 85 to 94 of the rod 67, to limit the travel of this rod. The rod 67 is moved by the adjusted element 42 to 49 with the aid of teeth 95 of the element gearing with teeth 96 of rod 67. The horizontal distances between the pins 75 to 84 and the corresponding teeth 85 to 94 correspond to the values of the figures marked on the keys 51. When a key 51 is being depressed only the left lever 64 is lowered at first in putting the spring 97 under tension. As soon as this left end of the lever 64 strikes against the locking bolt 73, the nose 74 of lever 65 is released so that it acts upon the corresponding adjusting element 42 to 49. The rod 67 is operated by this adjusting element 42 to 49 and moved until its tooth 85 to 94 strikes against the corresponding pin 75 to 84 whereby the movement of the corresponding adjusting element is limited. The corresponding pawl 52 to 59 engages with the teeth of the adjusting element and holds the same in the raised or adjusted position. At each stepwise movement of the block 50 for the interval between the adjacent adjusting elements the rod 67 is disengaged from the adjusting element and pulled back by the action of spring 70.

This form of construction presents the advantage that no accurate adjustment between key 51 and height of adjusting is necessary as the work of the keys is the same for each figure owing to the tension of spring 97 so that the adjusting becomes effective only when a key 51 has been completely depressed.

Figs. 10 and 11 show a further modification of the construction of the key mechanism which is characterized by the use of means which during the operation of the keys produce a positive connection between key 51, lever 60 and adjusting element 42 to 49 so that no excessive rotation of the adjusting elements can occur even when the rod 67 is omitted. The lever 60 has inclined slots 98, 99, 100 designed to receive studs 101, 102, 103 respectively of the keys 51 when any key is depressed, said slots being of such a shape that at the end of the depression of a key the corresponding stud 101, 102, 103 prevents excessive oscillation of the lever 60 around its fulcrum 61. The front part 65 of the lever 60 has a stud 104 and each adjusting element 42 to 49 has a radial slit 105 designed to receive stud 104. As the stud 104 moves along a circle having the fulcrum 61 as centre it must engage with slit 105 if the fulcrums 61 and 37 are conveniently arranged so that it prevents securely the automatic movement of the adjusting elements 42 to 49. Referring particularly to Fig. 11 it will be understood that upon the setting of a segment 52—55 they will move together in the direction of the arrow whereby stud 104 is released from the segment just set and resumes its lower position as shown in Fig. 10, the movement of the segments being such that said stud will be positioned below the slot of the next succeeding segment.

Each axle 3 to 9 of the counting mechanism (Figs. 12 and 13), except the axle 2, has a transmission lever 106, the upper extension 107 of which bears upon the rim of a cam disk 108 keyed on the corresponding axle 3 to 9, the cams of the disks corresponding with the figures "6" to "9". When the axle is being adjusted to "6", "7", "8" or "9" the corresponding cam disk 108 raises the extension 107 and consequently the transmission lever 106 so that its lower extension 109 is situated at the height of the incline 110 adjacent to each transmission lever 106. All the transmission levers 106 are mounted at 111 in a common frame 112 which is oscillably connected with the frame 113 of the counting mechanism at the points 114 and 115. The inclines 110, which are arranged on a sliding piece 116 running in guides 117 are pulled against the stop 119 by the action of a spring 118. When the carriage 1 is being pulled to the right the bolt 120 of the sliding piece is drawn along by a catch 121 fixed on the carriage so that the spring 118 is put under tension. An arm 122 of this catch 121 strikes against an abutment fixed on the base plate, so that, the carriage 1 being at the extreme right hand position, the catch 121 is oscillated and releases the sliding piece 116. This sliding piece 116 is pulled into its position of rest by the action of spring 118 (Fig. 14). The inclines 110 on the sliding piece 116 are moved along the multiplicator mechanisms 10 and act upon those transmission levers 106 the extensions 109 of which are in the path of said inclines. A third extension of the transmission levers, the transmission tooth 124, is thus brought in engagement with the toothed wheels 125 for the next higher place, keyed on the axles 2 to 8, which are rotated for one tooth. If at this occasion one place is advanced from "5" to "6" the transmission lever 106 is raised by the cam disk 108. As the corresponding incline 110 has already passed along the lower extension 109 the transmission lever ascends behind the incline 110 and the further raising and transmission is effected by the next following incline 110. After all operations have been completed the frame is oscillated in lateral direction through the action of guide rails 126 to 128 (Figs. 13 and 14). All extensions 124, 109 are thus brought, during the return travel of the carriage 1, out of engagement with the wheels 125 and with the inclines 110 and maintained in this position. The raised levers 106 drop back into the normal positions. The feeling lever 129 which is connected with the coupling of the machine allows the working of the machine only when the sliding piece 116 is in the position of rest, in contact with the left hand abutment 119.

The guide rails are arranged as follows:—

Figure 16:
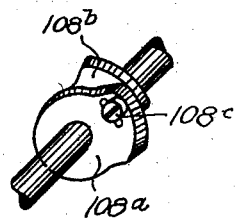
Fig. 16 shows by way of example an adjustable eccentric.

On the left hand side of the casing of the multiplicator mechanism (Figs. 12 and 13) a control lever 131 is pivotally mounted on a pivot pin 130. A stud 132 fixed in the frame 112 projects through the casing 113 into a slot 133 of the lever 131. When the sliding piece 116 is moving back into its position of rest the lower pin-shaped end 134 of lever 131 slides to the right along the rear edge (Figs. 13 and 14) of the guide rail 126, to be pushed forward at the right end of this guide rail by the guide piece 127, the above-mentioned transmission mechanism on the frame 112 being oscillated at this occasion, and the pin-shaped end 134 slides, at the return travel upon the carriage 1 along the frame edge until the guide piece 128 effects the re-engagement of the same. The cam disks 108 are keyed in this case on the axles 3 to 9. It would be easy to arrange the cam disks, with the aid of screws, pawls or the like, so that they are rotatable by themselves and to couple them with the axles according to requirement so that the transmission range may be determined only prior to or during the calculating. The cam 108 which effects the movement of lever 106 by means of the nose 107 is shown in Fig. 16 as being in two parts relatively adjustable. The part 108$^a$ is fixed on the shaft and provided with an elongated aperture while the other cam part 108$^b$ is loosely arranged on the shaft. This last part has a threaded hole designed to receive screw 108$^c$ which extends through the slot of part 108$^a$. By means of the screw 108$^c$ the two parts are adapted to be rigidly connected. By loosening the screw however, the parts are relatively adjustable so that the working surface of the cam can be increased or diminished so that an earlier or later oscillation of the lever 106 can be effected.

The determination of the working direction of the machine, viz, the operation of the reversing (positive, viz, adding for the figure "1"+"5"), negative=subtracting of the figures "6"—"9") is effected by two reversing cams 135, 136, through the intermediary of the two filling elements 137, 138 which operate the reversing rocking beam 139 the movements of which are communicated by the lever 140 and slide 141 to the reversing flap 142, which by means of lever 143' acts upon the left hand reversing lever 144 (corresponding to lever 20 of Patent 1,566,961) of the main counting mechanism.

The rotation of the axles 2 to 9 is controlled by two pawl levers 145, 146, the one of which works to the right and the other one to the left. These levers 145, 146 are keyed on the common axle 147. For each lever 145, 146 one toothed wheel 148, 149 is arranged which has teeth only on part of its circumference. The wheel 148 for the lever 145, which feeds the axle in the positive direction (from "5" over "4" to zero) has five teeth, each of the teeth corresponding with one of the digits "1", "2", "3", "4", "5". The toothed wheel 149 for the other lever 146 which feeds the axles 3 to 9 in negative direction, (from "6" across "9" to zero) has four teeth corresponding with the figures "6", "7", "8", "9". While lever 145 is working the lever 146 is idle and inversely. The levers 145, 146 are operated in the usual manner from the machine so that at every stroke of the crank the levers 145, 146 are reciprocated once (see lever 37 and associated linkage, Patent 1,566,961). The releasing of the carriage at zero is effected in the well known manner by the zero cam 150 on the axles 2 to 9 which, as soon as the axles 2 to 9 have arrived at zero produces the releasing of the carriage 1 with the aid of the intermediate element 151, as described in the above-mentioned patent.

Cam 136 is in the form of a segment corresponding in shape and disposition on the shaft with toothed segment 148, and the same applies to cam 135 relative to segment 149. Thus, if the toothed portion of either of segments 148 or 149 is in the path of its cooperating pawl when their shaft 3—9 comes into working position, the corresponding cam will be in position to abut and depress one of the filling pieces and correspondingly rock member 139. The correct adjustment of lever 144 is thus effected through the described linkage. The filling pieces 137 and 138 are pivoted at their left ends for vertical oscillation. For the sake of simplicity, however, they may be omitted as non-essential.

The lever 143 displaces the reversing flap 142 whereby the reversing nose 152 is made to engage either with the slide 154 belonging to the zig-zag bar 153 (for division) or with the slide 141 belonging to the reversing rocking beam 139 (for shortened multiplication). At division the counting mechanism 155 (Figs. 1 to 3) for the rotations adds when the calculating mechanism subtracts and inversely the method of carrying out shortened multiplication may be best understood from the following example: If for instance by means of the multiplicator keys 51 (Figs. 1 to 11) one sets up the number 98, the noses 107 of the levers 106 will be lifted by the cams 108 and abutments 109 will be brought into the path of abutments 110. Upon drawing the carriage to the right as in Fig. 2, as has been described above, the 9 will be advanced one place by the nose 124 (Fig. 12) of the lever 106 belonging to the number 8 and will thus be changed to a zero. The same thing will happen with respect to the number place at the left of the 9 which now instead of showing zero will show 1. Instead of 98 therefore, the value 108 stands in the multiplicator mechanism. The machine now operates in the following manner. The 1 standing in the hundreds place is now changed to zero by the reverse rotation of the shaft 3—9 on which this figure is represented. This operation demands one revolution of the machine and the multiplicand has been multiplied by one hundred. Zero having appeared the machine carriage is released by cam 150 in the same manner as has been described in Patent 1,566,961 mentioned above. Since a zero appears in the next place of the multiplier the machine carriage will not stop at this place but will move on to the units place in which the 8 has been set up. Upon the entrance of this 8 into the working position the shaft on which this figure is represented will be advanced two places to zero two revolutions of the operating crank being necessary. At the same time by means of members 135, 139, 140, 141, 152, 142, 143' and 144 the calculating mechanism and rotation counter have been set to subtraction, in known manner. Thus the two too many multiplications made by the multiplication in the hundreds place have been subtracted. It is thus obvious that in making the multiplication by the shortened method only three turns of the crank handle have been necessary although in making the same calculation 17 revolutions of the crank handle would be necessary if the device according to Patent 1,566,961 were used. From the above example it is evident that by shortened multiplication the revolution counting mechanism adds when the calculation mechanism adds, and vice versa. The parallel and cross connections required for this purpose consists of the lever 158 (Fig. 17) adapted to be oscillated around its foot pivot 157, the reversing rod 161 of the counting mechanism 155 for the rotations (Figs. 1 to 3) at the upper traverse 159 of lever 158 being adapted to be displaced by the action of the right hand control lever 160. It will be noted that lever 144 has a pin engaging one end of lever 158, while rod 161 is at one end of an elongated transverse slot at the other end of the lever. Thus, upon switching lever 144, rod 161 will be reciprocated. When division is to be done, lever 160 and rod 161 take the position shown in dotted lines.

As is known the Mercedes "Euklid" calculating machine may be provided with a keyboard, and in Fig. 18 such a keyboard is shown with the side walls removed. In the known manner the depressed keys are held in depressed position by the locking bar 261. If the depressed keys are to be released rod 175, through which passes a pin 173 of a releasing flap 174 is pulled in the direction of the arrow so that the flap is rocked about its axis 176 in a counter-clockwise direction. The flap 174 engages with its lower portion the hooked shaped ends 166 of the locking bars 261. By such a rocking movement of the flap 174 the locking bars 261, of which one is provided for each row of keys, is moved contrary to the direction of arrow 162 until the projections 260 release pins 259. In addition the release of the depressed keys is to take place after each crank rotation. This is brought about in the following manner. To the frame of the keyboard an angle lever 188 is pivoted and this has pivoted to its arm 189 by means of screw 185 a lever 186, which is pivoted at its upper end to the draw bar 175. A collar 181 is fixed to the drive axle of the machine and this collar has a nose 182 on its circumference, a lever 183 is pivoted to the machine frame and has a nose 184 which cooperates with nose 182, and this lever is normally urged in a counter-clockwise direction by means of a spring not shown. After rotation of crank 256 in clockwise direction for about 345 degrees the lever 183 is rocked about its pivot point in clockwise direction due to the contact of noses 182 and 184. The lever 183 transmits this movement to lever 186, which in turn pulls bar 175 in the direction of the arrow, thus swinging flap 174 and releasing the keys. The described operation only takes place at addition, when each crank rotation is to add a different value. Under such circumstances the lever 188 which projects through the top of the machine is moved by means of handle 187 to "A." At multiplication the release mechanism must not be actuated at each crank revolution, since the value of the said keys must be repeatedly transmitted to the calculating mechanism. In order to render the releasing mechanism inoperative, therefore, lever 188 is moved to "M," whereby lever 186 pivoted thereto is raised for such a distance that it is removed from the influence of lever 183 and is not affected by the oscillations of the latter. Accordingly the releasing flap 174 remains at rest so that the keys remain depressed until bar 175 is actuated, which may be done by hand through suitable provisions.

At addition, in order to carry over a value to the counting mechanism, one crank rotation of 360 degrees is necessary. If this rotation is overstepped, even for a short distance, the keys are released but 1 is added in the counting mechanism. This mistake must then be corrected in known manner, causing the loss of much time. In order to prevent such overstepping a crank lock is provided which, after a rotation of 360 degrees, locks the crank so that it can not again be rotated until the depression of a key of the keyboard. This locking mechanism is arranged as follows:

A flap 165, provided with journals 163, is parallelly arranged to the released flap 174 and the journals of the two flaps rest in the same bearing block. Flap 174 has at its upper portion a pin 173 and flap 165 has a pin 167 at its lower portion. Both of these pins are connected by means of a bar 169, which is provided with a stud exactly at its center point. By means of this stud the bar 169 carries a rail 172 which extends along the keyboard and is connected to a latch 177, as shown. Latch 177 is pivotally attached to the main frame and is continually urged in counter-clockwise direction by means of a spring, so that it has the tendency to contact with its free arm against the collar 181. Normally this free arm is in the path of a lever 178 which is pivotally mounted in the collar and is continually urged by means of spring 179 in a clockwise direction. The operation of this locking mechanism is as follows:

At the depression of the key the locking bar 261 is displaced in known manner in opposite direction to arrow 162 by the action of pin 259 on the upper oblique surface of projection 260. At the movement of the locking bar 261 the releasing flap 174 remains at rest, although the flap 165 undergoes a rocking motion in a counter-clockwise direction moved by the end 166 of the locking bar. Consequently the bar 169 executes a counter-clockwise oscillation about pin 173. The rail 172 is consequently displaced in opposite direction to the arrow and latch 177 is swung in clockwise direction. Lever 178 is normally so positioned that it abuts the free end of latch 177 and is in turn abutted by the end wall of the recess of the collar in which it lies, so as to prevent a rotation of crank 256. When latch 177 is swung as described, however, lever 178 is freed and is drawn by means of spring 179 to the other end of the recess whereby crank 256 is released. After this has taken place the lever can be turned through 360 degrees again since lever 178 again strikes latch 177 which has been returned into cooperating position through the action of its spring.

If rod 175 is actuated by hand for the key release, latch 177 must remain in locking position until the keys have been set again. This is effected in that upon rocking flap 174 and with it flap 165 simultaneously in counter-clockwise direction, stud 170, on account of its disposition, remains at rest and does not influence link 172. The unlocking of the crank takes place only when bar 169 is rocked about pin 173 and not when pins 173 and 167 are rotated in the same direction and stud 170 lies at the center of their circular movement. In order to render the crank lock inoperative at multiplication, link 172 has an upright arm 191 which extends into the vicinity of lever 188. Upon moving lever 188 from "A" to "M" it abuts arm 191 with its nose 190 and displaces the link 172 oppositely to arrow 162 so that the latch 177 is brought out of reach of lever 178. This displacement of link 172 has no effect upon the two flaps, since slot 171 permits a free rearward movement relative to stud 170.

On the stationary part of the calculating machine 192 (Figs. 1 to 4), the feeding mechanism, a shaft 194 is journaled in the bearings 195 and 196 and extends transversely to the windows 193 of the figure adjusting mechanism. A groove 197 of spiral shape is cut into the circumference of shaft 194. The decimal index finger 199 is adapted to slide on a stationary guide bar 198 for the carriage. A stud 200 of this decimal index finger projects into the spiral-shaped groove 197 so that when the index finger is shifted the shaft 194 is rotated. The decimal index finger 199 has a handle. On the outer end of shaft 194 a gear wheel 201 is keyed (Fig. 3) which meshes with a gear wheel 202 keyed on a square shaft 204 journaled at 203. On the carriage 1 of the machine a guide 205 is arranged which permits of shifting a frame 206 by means of a handle 207. A decimal index 208 for the rotation counter 155 is keyed on frame 206. On the web 209 of the frame 206 slides the decimal index finger 210 for the main counter 156. This index finger 210 is controlled by a sleeve 211 rotatably mounted on the frame 206 and having a spiral shaped groove 212 with which engages a stud 213 of the index finger 210. A plate 214 rigidly connected with sleeve 211 has a square hole in which the square axle 204 is mounted the length of which corresponds with the extreme right hand position of the carriage 1, so that the plate 214 and the mechanisms connected with this plate (frame 206, sleeve 211, decimal index finger 210) are adapted to be shifted on this square axle.

By this connection the carriage 1 and on the same the frame 206 may be freely moved, every rotation of the square axle 204 being transferred to the sleeve 211 and causing a shifting of the decimal index finger 210 in the main counting mechanism 156. The tooth wheel transmission of the gear wheels 201, 202 is selected in such a manner that the displacement of the decimal index finger 199 for a number of places in the adjusting mechanism 193 produces a displacement of the decimal index finger 110 for the same number of places with regard to the frame 206. The frame 206 may be displaced itself, the decimal index finger 208 indicating the number of places and the decimal index finger 210 participating in this displacement. As the product or the dividend is contained in the main counting mechanism 156, the one factor or divisor being contained in the adjusting mechanism 193 and the other factor or quotient in the rotation counter 155, the number of the places separated from the right by the decimal index finger 210 must be equal to the sum of the places separated by the index fingers 199 and 208. The movable frame 206 possesses with regard to the carriage 1 of the counting mechanism a much greater friction, which might be increased by shallow notches, then the friction of the square axle 204 in the guide disk 214.

The operation and working of the mechanisms is as follows when the carriage 1 is in the left hand position:

The one factor in the adjusting mechanism 193 and the other factor in the rotation counter 155 are adjusted. In the adjusting mechanism 193 the decimal index finger 199 is shifted to the desired place whereby the decimal index finger 210 is displaced for the same number of places. The other factor is then adjusted in the rotation counter 155 and subdivided by the decimal index finger 208 by displacement of the frame 206 whereby the decimal index finger 210 is operated again and moved for the same number of places so that it is preliminarily adjusted to the proper place in the main counting mechanism 156. The operation of the mechanisms remains the same even when the adjusting is done in inverse succession.

At division the dividend is adjusted in the main counting mechanisms 156 and the divisor in the adjusting mechanism 193. The decimal index fingers 199 and 210 are to be adjusted in the manner described above so that the decimal index finger 208 is preliminarily adjusted automatically to the correct place of the quotient which will appear later on in the rotation counter 155.

As example the following calculation will be cited:

A.—Multiplication.

Problem "234,5634 × 33,624"

1. Adjusting of the first factor "2345634" in the adjusting mechanism 193.
2. Shifting of the comma 199 so that it stands between "4" and "5".
3. Multiplication in the well known manner by "33624".
4. Shifting of the frame 206 until the comma 208 stands between "3" and "6".
5. Reading of the result "7886,9597616" with the aid of the automatically adjusted comma 210.

B.—Division.

Problem "224,386 : 3,85"

1. Adjusting of the dividend 224386 in the main counting mechanism 156 (left).
2. Adjusting of the divisor in the adjusting mechanism 193 (left).
3. Shifting of the comma 199 until it stands between "3" and "8" (3,85).
4. Shifting of the frame 206 until the comma 210 stands between "4" and "3" (224,386).

From this moment the comma 208 is already correctly positioned in the quotient mechanism 155. At the dividing "58" will appear at the left and "28207" at the right of the comma 208 (=58,28207).

On the frame 206 as well as on the web 209 or on the carriage guide 205 several marks standing at permanent or adjustable distances apart may be arranged instead of the one mark only. Other counting mechanisms might also be considered, for instance the multiplicator mechanism, or a multiple subdivision of a number, for instance into milliards, millions and thousands. A similar transmission might be used for another counting mechanism carriage, for instance for calculating machines with double ruler.

I claim:—

1. In a calculating machine having a carriage adapted upon release in a limit position of travel to control a calculating process, a plurality of transmission elements in said carriage, an adjusting mechanism, means for setting said adjusting mechanism in accordance with numerical values, said transmission elements being adapted to abut said adjusting mechanism upon movement of said carriage toward said limit position whereby said transmission elements are displaced in accordance with the setting of said adjusting mechanism.

2. In a calculating machine, elements revolubly adjustable to numerical values, means operable upon the adjustment of one of said elements to a digit value above "5" for transferring to the next higher place, and means operable for successively zeroizing said adjusted elements by unit steps, those elements representing values of "5" or below being negatively returned to "0" and those representing values above "5" being positively advanced to "0".

3. In a calculating machine having a carriage, a plurality of slidable racks in said carriage, means for displacing said racks in accordance with numerical values upon the advancing of the carriage, revolubly adjustable elements in said carriage, and means for bringing said revoluble elements into engagement with said racks upon the advancing of the carriage, as and for the purpose described.

4. In a calculating machine, number wheels, means for setting a multiplier having a plurality of digits on said number wheels, and means for zeroizing said number wheels successively by a forward or backward movement according to whether their respective values do or do not exceed a predetermined amount, for the purpose described.

5. In a calculating machine having a carriage, a number wheel, means for setting a multiplier on said number wheel, a shaft supporting said number wheel, a segment having four teeth and a segment having five teeth fixed on said shaft, and a rocking single-acting pawl operable on each of said segments, said pawls acting in opposite directions, whereby a multiplier of the value "5" or below being set on said number wheel, the latter is returned to zero in a negative direction through the coaction of said five-toothed segment and its associated pawl, and a multiplier above the value "5" being set on said number wheel, the latter is advanced to zero in a positive direction through the coaction of said other segment and pawl, and means on said shaft for effecting the carriage release upon the zeroization of said number wheel.

6. In a calculating machine according to claim 5, a state control for the computing mechanism and a state control for the revolution counter, and automatic means for setting said controls to "Add" prior to the negative rotation of said shaft or to "subtract" prior to the positive rotation thereof.

7. In a calculating machine according to claim 5, a state control for the computing mechanism and, a state control for the revolution counter, and means on said shaft for automatically setting said controls to "Add" prior to the negative rotation of said shaft or to "subtract" prior to the positive rotation thereof.

8. In a calculating machine a state control lever for the computing mechanism, said lever being pivoted intermediate its length, an intermediate lever having an elongated slot and being pivoted at a point laterally spaced from said slot, one end of said state control lever engaging said intermediary member for oscillating the latter about its pivot point, a bar for controlling the state of the revolution counter, said bar engaging in said slot, and means for moving said bar from one end of said slot to the other.

9. In a calculating machine of the type described, an adjustable element, a set of keys, means controlled by said keys for imparting an adjusting movement to said adjustable element, means actuated in dependence upon the movement of the adjusting element, and abutment means for differentially arresting said last-named means in accordance with key values.

10. In a calculating machine of the type described, an adjustable element, a set of keys, means controlled by said keys for imparting an adjusting movement to said adjustable element, means actuated in dependence upon the movement of the adjusting element, and abutments on said keys brought selectively into the path of movement of said last-named means upon the depression of selected keys for differentially arresting said last-named means.

11. In a calculating machine of the type described, an adjustable element, a set of keys, an articulated lever pivotally mounted at its point of articulation, one end of said lever being under the control of said keys and the other end of said lever adapted upon movement to adjust said adjustable element, means normally locking said adjusting end in neutral position relative to said adjustable element, and means operated by the key-controlled end of said lever for releasing said locking means upon the depression of a key.

12. In a calculating machine having a carriage adapted upon release in a limit position of travel to control a calculating process, a plurality of number wheels, transfer members, abutments on said transfer members, a slide, means for initially displacing said transfer members upon the setting of the wheels to numbers above 5 for bringing said abutments in the path of said slide, means for setting the wheels during the carriage advance, a spring for impelling said slide, means for energizing said spring during the carriage advance, and means for releasing said spring upon the arrival of the carriage in said limit position, whereby said slide is impelled by said spring against the displaced abutments for effecting the transfer.

13. In a calculating machine of the type described, a number key, means for locking said key in depressed position, a crank, means actuated upon rotation of said crank for releasing said locking means, and means for locking said crank upon the completion of its rotation.

14. In a calculating machine of the type described, a number key, means for locking said key in depressed position, a crank, means actuated upon rotation of said crank for releasing said locking means, means for locking said crank upon the completion of its rotation, and means actuated through said key-locking means upon the depression of said key for releasing said crank-locking means.

15. In a calculating machine of the type described, a key, a slidable locking bar for said key, a pair of rocking members having adjacent pivots for permitting rocking in the same plane, said key-locking bar having a lug intermediate adjacent ends of said rocking members, means for rocking one of said members whereby said locking bar is displaced for releasing said key and simultaneously imparts a rocking motion to the other of said members, a connecting bar pivoted to each of said members at points equidistant from their pivots, a crank, a locking latch for said crank, and an operating link pivoted to said latch and to said connecting bar at its intermediate point, whereby upon the simultaneous movement of said rocking members the pivot point of said link and said connecting bar remains substantially stationary and said latch uninfluenced.

16. In a calculating machine of the type described, a number key, a locking bar for said key slidable in one direction and displaceable upon depression of the key, a crank, locking means for said crank, means operable through said locking bar upon a depression of said key for releasing said crank-locking means. Said means including a rocking member partaking in the movement of said bar, a rocking member for displacing said bar for releasing said key, and means for compensating the consequent movement of said first rocking member through that of the second for preventing actuation of the crank-releasing means.

17. In a calculating machine having a carriage, a plurality of racks in said carriage, spur wheels normally spaced from the teeth of said racks in alignment therewith, number wheels in connection with said spur wheels, an adjusting element adapted to be set in accordance with numerical values, means for displacing said racks into engagement with said spur wheels upon an advance movement of the carriage, said racks abutting said adjusting element during the carriage advance and being accordingly displaced relative to the carriage and said spur wheels.

18. In a calculating machine having a carriage, a plurality of racks in said carriage, spur wheels normally spaced from the teeth of said racks in alignment therewith, number wheels in connection with said spur wheels, an adjusting element adapted to be set in accordance with numerical values, means for displacing said racks into engagement with said spur wheels upon an advance movement of the carriage, said racks abutting said adjusting element during the carriage advance and being accordingly displaced relative to the carriage and said spur wheels, and means for replacing said racks at the limit of carriage advance.

In testimony whereof I affix my signature.

CARL SCHLÜNS.